United States Patent
Filippov et al.

(10) Patent No.: US 11,741,625 B2
(45) Date of Patent: Aug. 29, 2023

(54) SYSTEMS AND METHODS FOR THERMAL IMAGING

(71) Applicant: Elphel, Inc., West Valley City, UT (US)

(72) Inventors: Andrey N. Filippov, Magna, UT (US); Oleg Dzhimiev, Salt Lake City, UT (US); Olga Filippova, Magna, UT (US)

(73) Assignee: Elphel, Inc., West Valley City, UT (US)

( * ) Notice: Subject to any disclaimer, the term of this patent is extended or adjusted under 35 U.S.C. 154(b) by 242 days.

(21) Appl. No.: 17/346,143

(22) Filed: Jun. 11, 2021

(65) Prior Publication Data

US 2021/0390726 A1 Dec. 16, 2021

Related U.S. Application Data

(60) Provisional application No. 63/057,164, filed on Jul. 27, 2020, provisional application No. 63/038,638, filed on Jun. 12, 2020.

(51) Int. Cl.
*G06T 7/593* (2017.01)
*G06T 7/529* (2017.01)
(Continued)

(52) U.S. Cl.
CPC .............. *G06T 7/593* (2017.01); *G06N 3/04* (2013.01); *G06T 3/0006* (2013.01); *G06T 5/006* (2013.01);
(Continued)

(58) Field of Classification Search
CPC ........ H04N 13/243; H04N 5/33; H04N 23/90; G06T 2207/10048
See application file for complete search history.

(56) References Cited

U.S. PATENT DOCUMENTS

2001/0036307 A1 11/2001 Hanna et al.
2007/0003162 A1* 1/2007 Miyoshi ................ G08G 1/167
382/276
(Continued)

OTHER PUBLICATIONS

Filippov A, Dzhimiev O. See far with TPNET: a Tile Processor and a CNN Symbiosis. arXiv preprint arXiv:1811.08032. Nov. 20, 2018. (Year: 2018).*

(Continued)

*Primary Examiner* — Clifford Hilaire
(74) *Attorney, Agent, or Firm* — Thorpe North & Western

(57) ABSTRACT

A technology is described for thermal imaging. In one example of the technology, a plurality of thermal sensors in a non-collinear configuration are used to simultaneously image scene regions of an ambient environment. Series of synchronized thermal image sets may be obtained from the thermal sensors, and virtual-stereo pairs of image tiles may be defined by selecting image tiles from a plurality of undetermined pairs of image tiles. Thereafter, two-dimensional (2D) correlation may be performed on the virtual-stereo pairs of thermal image tiles to form 2D correlation tiles for the scene region of the ambient environment, and a depth map of the ambient environment may be generated after consolidating the 2D correlation tiles corresponding to the same environmental objects to increase contrast of objects represented in the depth map.

20 Claims, 11 Drawing Sheets

(51) Int. Cl.

| | |
|---|---|
| *G06T 7/70* | (2017.01) |
| *H04N 13/243* | (2018.01) |
| *H04N 13/296* | (2018.01) |
| *H04N 13/271* | (2018.01) |
| *H04N 13/156* | (2018.01) |
| *H04N 5/33* | (2023.01) |
| *G06T 7/246* | (2017.01) |
| *G06T 3/00* | (2006.01) |
| *G06N 3/04* | (2023.01) |
| *G06T 5/00* | (2006.01) |
| *H04N 13/00* | (2018.01) |

(52) U.S. Cl.
CPC .............. *G06T 7/248* (2017.01); *G06T 7/529* (2017.01); *G06T 7/70* (2017.01); *H04N 5/33* (2013.01); *H04N 13/156* (2018.05); *H04N 13/243* (2018.05); *H04N 13/271* (2018.05); *H04N 13/296* (2018.05); *G06T 2207/10048* (2013.01); *G06T 2207/20021* (2013.01); *G06T 2207/20084* (2013.01); *G06T 2207/20221* (2013.01); *H04N 2013/0081* (2013.01)

(56) References Cited

U.S. PATENT DOCUMENTS

| | | | |
|---|---|---|---|
| 2012/0169842 A1 | 7/2012 | Chuang et al. | |
| 2013/0286213 A1* | 10/2013 | Cetin | .................. G06T 7/254 |
| | | | 348/164 |
| 2014/0050355 A1* | 2/2014 | Cobb | .................. G06V 20/41 |
| | | | 382/103 |
| 2014/0063229 A1 | 3/2014 | Olsson et al. | |
| 2014/0104378 A1 | 4/2014 | Kauff et al. | |
| 2016/0267665 A1 | 9/2016 | Venkataraman et al. | |

OTHER PUBLICATIONS

Nalpantidis L et al. Obtaining reliable depth maps for robotic applications from a quad-camera system. InIntelligent Robotics and Applications: Second International Conference, ICIRA 2009, Singapore, Dec. 16-18, 2009. Proceedings 2 2009 (pp. 906-916). Springer Berlin Heidelberg (Year: 2009).*

Filippov et al. "long Range 3D with Quadocular Thermal (LWIR) Camera", rXiv:1911.0S975v2 1-20 [cs.CV] Nov. 21, 2019. Retrieved on Aug. 31, 2021. Retrieved from <URL: https:t/arxiv.org/pdf/1911.06975.pdf> entire document.

* cited by examiner

SYSTEMS AND METHODS FOR THERMAL IMAGING

RELATED APPLICATIONS

This application claims the benefit of U.S. Provisional Patent Application Ser. No. 63/022,347, filed Jun. 12, 2020, entitled, "Method for the 3D Thermal Imaging Motion-blur Mitigation and Contrast Enhancement", and U.S. Provisional Patent Application Ser. No. 63/057,164, filed Jul. 27, 2020, entitled, "Method for the 3D Thermal Imaging Motion-blur Mitigation and Contrast Enhancement", which are incorporated by reference in their entirety herein.

BACKGROUND

Long Wave Infrared (LWIR) cameras provide images regardless of ambient illumination. LWIR cameras tolerate fog and are not blinded by incoming car headlights. These features make LWIR cameras attractive for autonomous navigation, security and military applications. Thermal imaging has long been a topic of interest for night-time driving, especially for military applications. For example, due to the detectability of other low-light ranging techniques like LIDAR, which emits radiation that can be detected by properly equipped adversaries, there is a need for a non-detectable ranging technique which can be used for night-time driving operations.

Typically two types of thermal image sensors are currently in use. These include cooled thermal image sensors and uncooled thermal image sensors. Cooled thermal image sensors use a photon detection principle where each pixel of the sensor outputs a signal proportional to a number of absorbed photons. The photon detectors are cooled to prevent photons emitted by the camera parts themselves from flooding the thermal image sensor. Uncooled thermal image sensors comprise an array of micro-bolometers heated by incoming radiation and generate output proportional to a detected temperature. The uncooled thermal image sensors operate when pixels of a micro-bolometer are heated by thermal radiation and conduction received from any direction.

Figure 1A:
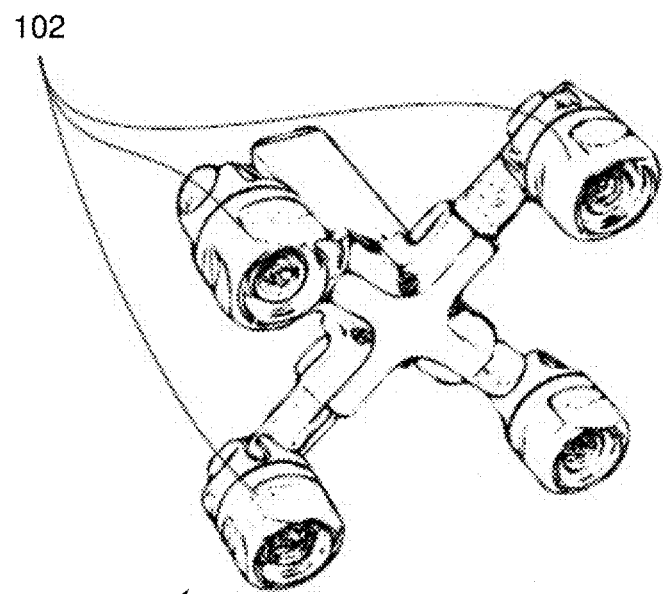
FIGS. 1A-B are diagrams illustrating example thermal imaging systems that have a plurality of infrared sensors in non-collinear arrangements.

These drawings are provided to illustrate various aspects of the technology and are not intended to be limiting.

DETAILED DESCRIPTION

Before the present technology is disclosed and described, it is to be understood that this disclosure is not limited to the particular structures, process steps, or materials disclosed herein, but is extended to equivalents thereof as would be recognized by those ordinarily skilled in the relevant arts. While examples of the technology are described in sufficient detail to enable those skilled in the art to practice the invention, it should be understood that other embodiments may be realized and that various changes to the technology may be made without departing from the spirit and scope of the present technology. Thus, the following more detailed description of the technology is not intended to limit the scope of the technology, as claimed, but is presented for purposes of illustration only and not limitation to describe the features and characteristics of the present technology, to set forth the best mode of operation of the technology, and to sufficiently enable one skilled in the art to practice the technology. Accordingly, the scope of the present technology is to be defined solely by the appended claims.

Definitions

In describing and claiming the present technology, the following terminology will be used.

The singular forms "a", "an", and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of".

As used herein, the term "differential rectification" refers to a method of image rectification preceding image matching. Instead of the traditional full rectilinear rectification, the differential rectification reduces the required correction amount by transforming each image to the average distortion of all the participating images, thus replacing the warping with the small shifts of the image tiles performed in the frequency domain. Details of this method are described in [A. Filippov, "Method for the FPGA-based long range multi-view stereo with differential image rectification," Apr. 28 2020. U.S. Pat. No. 10,638,109 B2], which is incorporated by reference herein.

As used herein, the term "disparity" is an offset in pixels between a same object represented in thermal images generated by infrared sensors offset from one another.

As used herein, the term "egomotion" refers to three-dimensional (3D) motion of a thermal sensor within an environment. The 3D motion can include rotation (e.g., 3 axes of linear motion and 3 axes of rotation).

As used herein, the term "image tile" or "2D correlation tile" refers to a square window (e.g., 16 pixel by 16 pixel)

positioned on a twice denser grid (e.g., 8 pixel by 8 pixel) that overlaps with neighbor image tiles.

As used herein, the term "IMU" refers to an inertial measurement unit that provides information about one or more of: orientation, position in space, angular and linear velocities, and accelerations.

As used herein, the term "interscene" relates to thermal images or processed data (e.g., intrascene 2D correlations) acquired at different times.

As used herein, the term "intrascene" relates to simultaneously acquired thermal images by multiple infrared sensors.

As used herein, the term "LWIR" refers to long-wave infrared radiation in the range of 8-15 μm.

As used herein, the term "motion-blur" refers to motion artifacts in thermal images caused by movement of a thermal sensor during a thermal image integration time.

As used herein, the term "NETD" refers to a noise-equivalent temperature difference.

As used herein, the term "pose" refers to a combination of position and orientation of an object, typically a thermal imaging system or an individual infrared sensor.

As used herein, the term "SLAM" refers to simultaneous localization and mapping used for the computational problem of constructing or updating a map of an unknown environment while simultaneously keeping track of a location within the environment.

As used herein, the term "thermal sensor" refers to an electronic device that measures and detects thermal infrared radiation (e.g., long-wave or medium-wave infrared radiation) in a surrounding environment, and may include a camera device that creates a thermal image. A thermal sensor can include an LWIR sensor, a mid-wave infrared (MWIR) sensor, and other appropriate types of thermal sensors.

As used herein, the term "thermal image" or "thermogram" refers to an electronic image providing a visual display of an amount of infrared energy emitted, transmitted, and/or reflected by an object.

As used herein, the term "depth map" refers to an image or image channel that contains information relating to a distance of surfaces of scene objects from a viewpoint of a thermal sensor.

As used herein, the term "virtual-stereo pairs of thermal images" refers to a pair of thermal images acquired from a pair of thermal sensors, where the pair of thermal images provide views of a scene region from different viewpoints.

Present Technology

Technologies are described for thermal imaging for long-range distance estimation and 3D reconstruction of dynamic scenes using thermal self-radiation of scene objects without the need of ambient or artificial illumination. Applications of the technologies disclosed herein can include autonomous vehicle navigation and driver assistance, including high-speed vehicles.

In one example of the present technology, a thermal imaging system can include a plurality of thermal image sensors (e.g., Long Wavelength Infrared (LWIR) image sensors) arranged in a non-collinear configuration (e.g., a circular configuration, trapezoid configuration, and other non-collinear configurations), an inertial measurement unit (IMU) (either as a physical device, data input from an external source, or a software module that derives angular and linear velocities from the sequence of the registered images), and image processing modules to select and process virtual-stereo pairs of images for two-dimensional (2D) correlation and consolidate 2D correlation outputs to produce a 3D scene output. For example, the thermal imaging system can split thermal images generated by the thermal image sensors into a plurality of image tiles, where each image tile is associated with a scene region of an ambient environment (i.e., an image tile is a portion of a thermal image that represents or captures a portion of an ambient environment). Each image tile can be converted to a frequency domain. The thermal imaging system can define virtual-stereo pairs of image tiles for a scene region selected from the plurality of image tiles, and the thermal imaging system can perform 2D correlation on the virtual-stereo pairs of image tiles to form 2D correlation tiles for each scene region of an ambient environment. The thermal imaging system can consolidate the 2D correlation tiles associated with scene regions to generate a depth map of the ambient environment.

Prior thermal imaging systems typically use a single pair of horizontally offset cameras and calculate object distance by measuring disparity between two images acquired by the cameras. The ranging accuracy of these prior thermal imaging systems is limited by the disparity resolution of the systems, the map density is limited by the NETD of the individual cameras, and motion-blur is introduced into the images due to vehicle speed and vibrations (e.g., random vibrations caused by a rough terrain or rough road surface, such as experienced by off-road vehicles). For example, prior continuously ranging camera systems (such as camera systems in advanced driver-assistance systems (ADAS)) extract depth data from each scene independently and may consolidate depth measurements using, for example, an Extended Kalman Filter (EKF). However, this method fails in low-contrast environments when a single-scene depth measurement provides no usable data.

The current technology improves disparity resolution and depth density using, for example, an accurately calibrated quadocular LWIR system having thermal sensors arranged in a non-collinear configuration, and improves effective detector sensitivity and motion-blur mitigation using an IMU (either as a physical device, or data input from an external source, or a software module that derives angular and linear velocities from the sequence of the registered images) and image processing steps to produce a 3D scene output to enable long-range 3D perception for high-speed moving vehicles in low-contrast environments. For example, the current technology can consolidate many single-scene low-contrast measurements and thereafter calculate a range of objects within the scene.

Figure 1B:
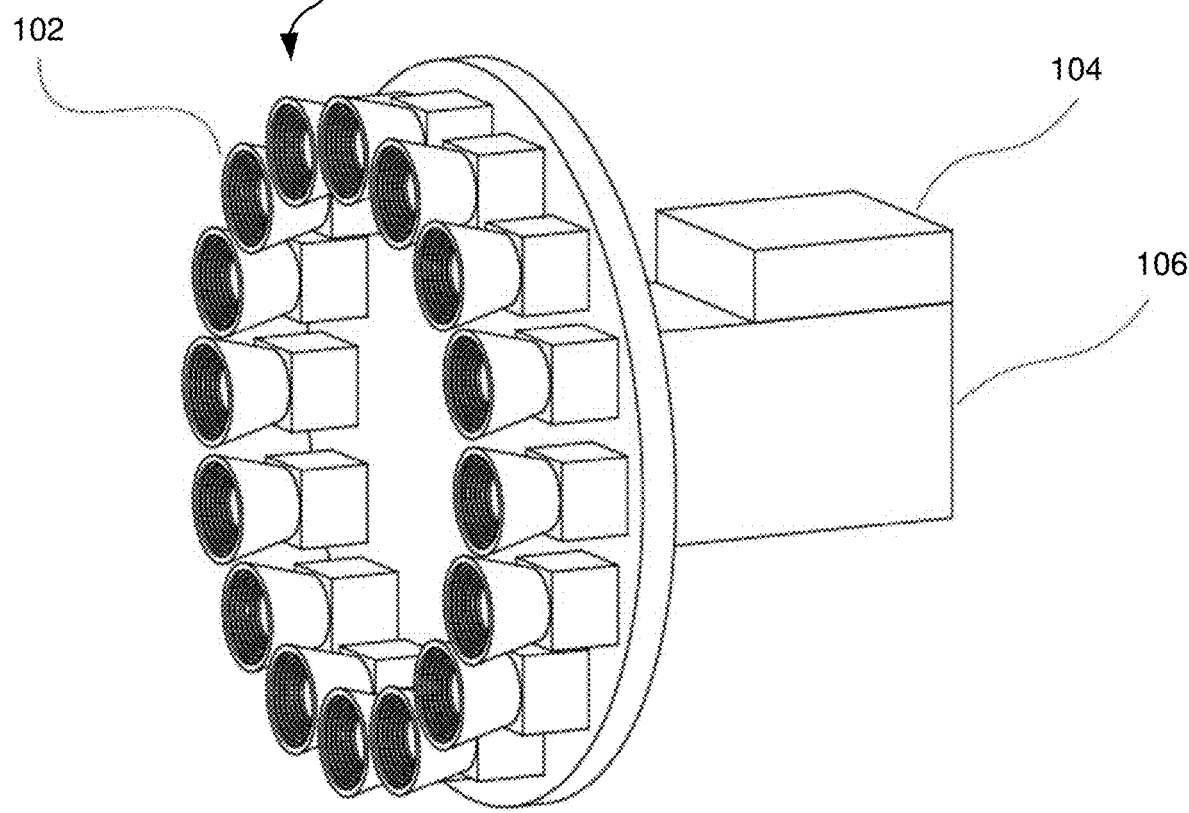

To further describe the present technology, examples are now provided with reference to the figures. FIGS. 1A-B illustrate thermal imaging systems 100 in accordance with examples of the present technology. A thermal imaging system 100 can include a plurality of thermal sensors 102 (e.g., three, four, eight, sixteen, or more) arranged in a non-collinear configuration (e.g., in a circle configuration, a trapezoid configuration, or other non-collinear configuration) and a processing unit 104 and an IMU 106. An application of the thermal imaging system 100 (e.g., vehicle mounted application, helmet mounted application, etc.) may determine the number and configuration of the thermal sensors 102.

The IMU 106 may be a dedicated hardware module, or a data input from an external device, or one or more software modules configured to calculate three linear and three angular components of egomotion. In a configuration that includes a large number of thermal sensors 102 (e.g., more than 16 thermal sensors 102), such that a single circle configuration would exceed a desired radius, the thermal sensors 102 can be arranged in concentric circles to allow the thermal sensors 102 to be closer to one another. In one example, the thermal sensors 102 may be oriented so that the three axes of each thermal sensor 102 are parallel to the axes of other thermal sensors 102 (or sensors in the same group). Rotations around a thermal sensor's optical axis in 90-degree increments may be allowed. In another example, a group of thermal sensors 102 may be divided into sub-groups where the axes of a sub-group of thermal sensors 102 are parallel. For example, a thermal imaging system having 16 thermal sensors 102 may contain four sub-groups of four thermal sensors 102 in a square configuration, where the axes of the thermal sensors 102 in a sub-group are parallel to one another. A sub-group of thermal sensors 102 as a unit may be rotated, such that the thermal sensors 102 within the sub-group are parallel to one another, and the sub-group as a unit is rotated in relation to another sub-group of thermal sensors 102.

The thermal sensors 102, in one example, may be uncooled thermal sensors comprising an array of microbolometers which are heated by incoming radiation and generate output proportional to the temperature of the incoming radiation. The uncooled thermal sensors operate when pixels are heated by thermal radiation photons. When compared to cooled thermal sensors, uncooled thermal sensors contain some weaknesses, such as lower sensitivity usually defined as NETD, which can be 2 to 6 times worse than that of cooled thermal sensors; high thermal inertia (typically 20 ms or higher, 7 ms for high-end thermal sensors) that causes significant motion-blur, especially for high-speed/high vibration applications; and a need for high lens speed (e.g., f-number≈1.0). The present technology mitigates these weaknesses for 3D perception, allowing the benefits of uncooled thermal sensor's lower cost (typically 20 to 50 times), smaller size and weight which makes uncooled thermal sensors a good solution for long-range thermal depth perception applications. However, it will be appreciated that the thermal sensors 102 can also include cooled thermal sensors, as well as combinations of cooled and uncooled thermal sensors, which may be primarily for object classification and identification if needed.

In one example, a total number of thermal sensors 102 included in a thermal imaging system 100 may be based on a maximum expected motion-blur (in pixels) and a reduction of system NETD compared to individual thermal sensor 102 NETD. For example, anticipated motion-blur can be determined using the specifications of a thermal sensor and a mounting platform (e.g., vehicle vibration). The number of thermal sensors in a non-collinear configuration determines how accurately virtual-stereo pairs of thermal images can be aligned to a direction of a motion-blur vector, defining a factor by which motion-blur can be reduced.

When capturing a 3D scene, any number of thermal images simultaneously generated by the thermal sensors 102 may be combined (which is in contrast to the 2D case where offset cameras would result in parallax between the thermal images, such that the thermal images will not match). A combination of multiple independently acquired thermal images allows increasing a signal-to-noise (S/N) ratio as a square root of the number of measurements (when measuring disparity and consequently object distances). The number of independent thermal image pairs for each image tile may depend on the presence of motion-blur. As an example, where the number of infrared sensors 102 is N>=4, the number of available image pairs equals N in the absence of motion-blur. Otherwise, the number of infrared sensors 102 is either $$\frac{N}{4} \text{ or } \frac{N}{4}+1$$

(with less sensitive pairs discarded), depending on the direction of the motion-blur. For N=16 when no motion-blur correction is needed, the number of independent image pairs (e.g., a same sensor may participate in two independent orthogonal pairs) and the number of measurements exceeds that for a single binocular camera by 16 times, and so the effective system NETD is $\sqrt{16}=4$ times lower than that of a binocular system. Using commercially available thermal sensors 102 with NETD of 40 millikelvin (mK), the 16-sensor system can result in an effective NETD of 10 mK, which is lower than a NETD of typical cooled thermal sensor systems.

Figure 2:
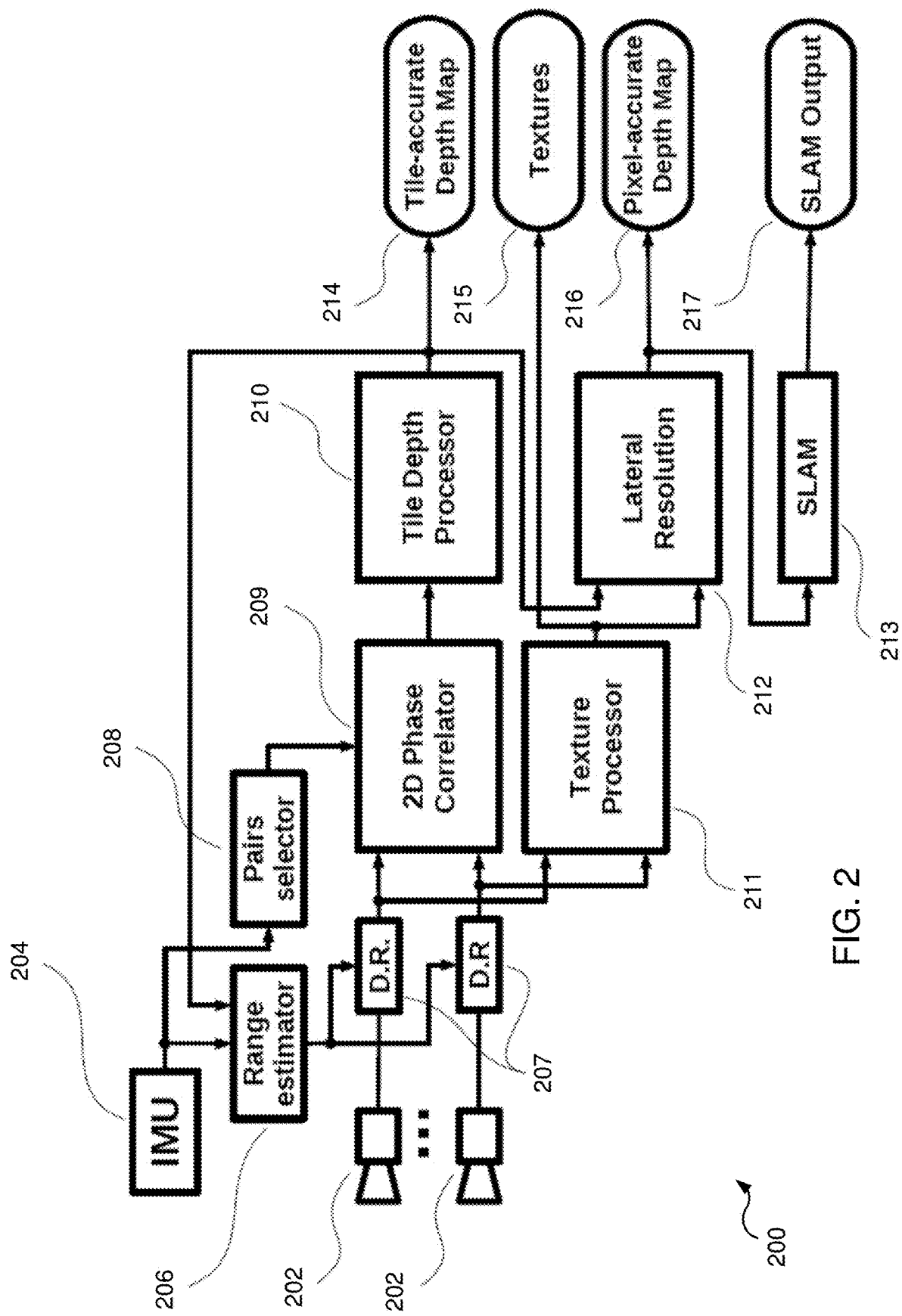
FIG. 2 is a block diagram that illustrates various example components included in a thermal imaging system.

FIG. 2 illustrates components of an example thermal imaging system 200 on which the present technology may be executed. As illustrated, the thermal imaging system 200 can include a plurality of thermal sensors 202, which, as described above, may be arranged in a non-collinear configuration to simultaneously generate thermal images of an ambient or surrounding environment. A thermal image generated by a thermal sensor 202 may be split into a plurality of image tiles. A reconstructed scene of an ambient environment may comprise a plurality of overlapping image tiles, where the image tiles participate in processing of the reconstructed scene as atomic entities.

The thermal imaging system 200 may include a range estimator module 206 configured to calculate corresponding positions of objects represented in simultaneously acquired thermal images generated by the infrared sensors 202. The range estimator module 206 can calculate (estimate) object ranges using thermal sensor photogrammetric calibration, optional field calibration, and egomotion using IMU 204 output (e.g., orientation, position in space, angular and/or linear velocities, and/or accelerations). The range estimator module 206 can use historic data comprising 3D reconstructions from earlier captured scenes to update range estimates for objects. For example, as a range to an object represented in image tiles changes (becomes closer or farther), the range estimator module 206 can update the range (distance) to the object using the historical data to iteratively refine depth map output.

The thermal imaging system 200 may include one or more differential rectification modules 207 configured to transform image tiles to a frequency domain and perform optical aberration correction. The thermal imaging system 200 may also include a pairs selector module 208 and 2D phase correlator module 209. The pairs selector module 208 can be configured to select virtual-stereo pairs of image tiles from a series of synchronized image tile sets, where a virtual-stereo pair of image tiles together provide views of a scene region at different angles used to enhance depth density in a scene region of a surrounding environment. In contrast to traditional binocular cameras where a system layout pre-defines each correlation pair, the present technology uses virtual-stereo pairs of images, where the pairs of images are not predetermined by a system layout, and the pairs selector module 208 identifies a subset of possible virtual-stereo pairs N*(N−1)/2 for each image tile for processing by the 2D phase correlator module 209. Phase correlation performed by the 2D phase correlator module 209 may take place in the frequency domain enabled by the convolution-multiplication property of transform. So, the computationally expensive transformation and aberration correction are performed for each image tile once, even if an image tile is used in multiple virtual-stereo pairs.

Figure 8A:
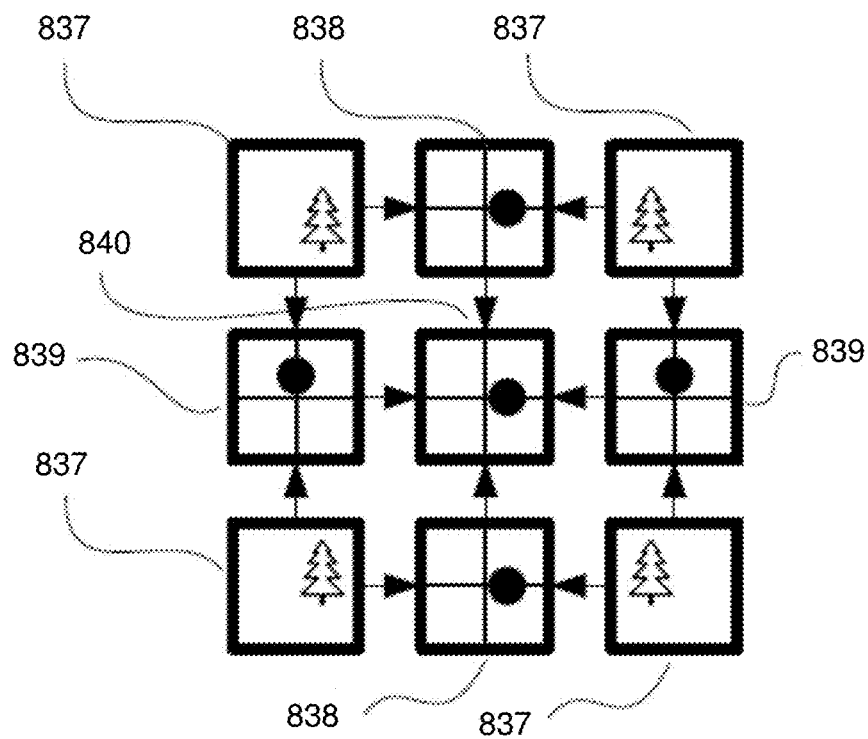
FIGS. 8A-C illustrate the use of intrascene 2D correlations and interscene accumulation to increase a signal-to-noise ratio of low-contrast objects in thermal images.
Figure 8B:
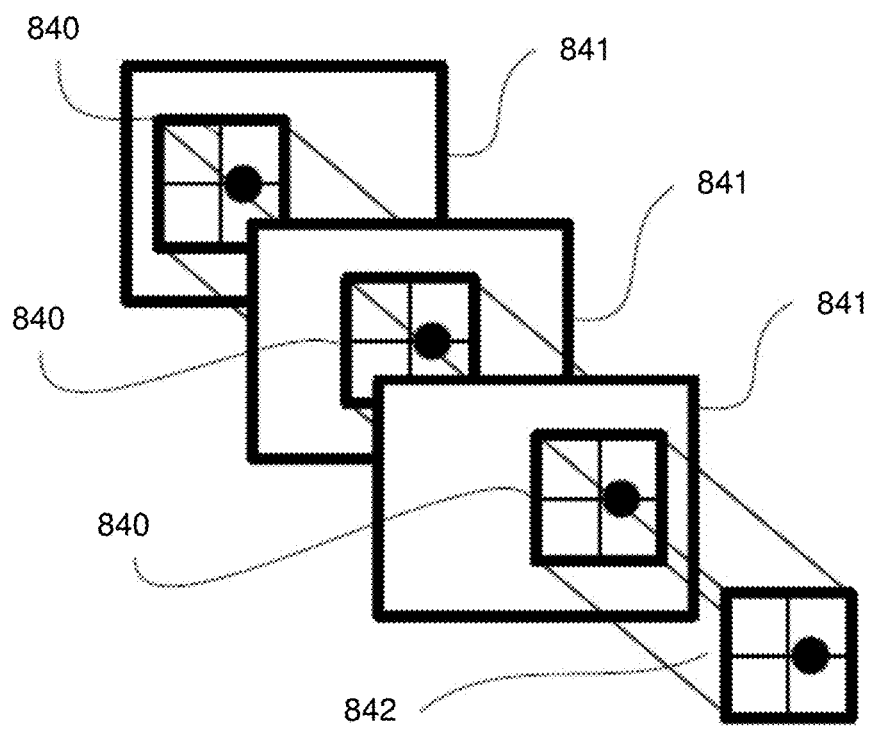

The thermal imaging system 200 may include a tile depth processor module 210 configured to determine a disparity between different representations of a same object in virtual-stereo pairs of image tiles corresponding to a scene region (e.g., an image tile of a thermal image). That is, thermal images generated by the thermal sensors 202 can be split into a number of image tiles, where each image tile is associated with a scene region of an ambient environment. The image tiles associated with a scene region can be paired to form virtual-stereo pairs, and the tile depth processor module 210 can determine a disparity between different representations of a same object in the virtual-stereo pairs. In one example, the tile depth processor module 210 can be configured to utilize a convolutional neural network model trained to extract disparity from a plurality of virtual-stereo pairs of image tiles, where the convolutional neural network is configured to identify 2D correlations of multiple stereo pairs simultaneously. For example, output from the 2D phase correlator module 209 can be provided as input to the convolutional neural network model, which outputs a scene depth for the virtual-stereo pair. The depth processor module 210 may operate in intrascene mode which processes simultaneously acquired images of a scene region (as shown in FIG. 8A), or operate in interscene mode which accumulates 2D correlations from a sequence of image tiles (as shown in FIG. 8B). In one example, the output of the depth processor module 210 can be fed back to the range estimator module 206 to re-process image tiles for which initial estimation had a significant error. In the case that lateral resolution enhancement is not needed, the output of the depth processor module 210 can be provided as a tile-accurate depth map 214.

A texture processor module 211 included in the thermal imaging system 200 may be configured to merge aligned image tiles output by the differential rectification modules 207 and output 2D texture tiles 215. A 2D texture tile 215 produced by the texture processor module 211 may have an increased S/N as compared to the output of a single thermal sensor 202 by a factor of $\sqrt{N}$ (e.g., factor of 4 for a 16-sensor system). The 2D texture tiles 215 can be used to generate a photo-realistic 3D scene output. Similarly to the depth processor module 210, the texture processor module 211 can operate in intrascene mode or use interscene mode accumulation to improve low-textured areas in a scene region.

The thermal imaging system 200 may include lateral resolution module 212 configured to generate a pixel-accurate depth map 216 by merging the 2D texture tiles 215 output by the texture processor module 211 with the tile-accurate depth map 214 output by the tile depth processor module 210. In one example, lateral resolution module 212 may utilize a deep neural network to produce a higher resolution pixel-accurate depth map 216. A SLAM module 213 included in the thermal imaging system 200 can be used to additionally enhance reconstructed 3D scenes and improve motion-blur mitigation. For example, a sequence of 3D scenes corresponding to image tiles can be input to the SLAM module 213 to update reconstructed 3D scenes of a surrounding environment while keeping track of a location within the environment. While FIG. 2 illustrates one example of a system that may implement the techniques above, many other similar or different environments are possible. The example environment discussed and illustrated above is merely representative and not limiting.

Figure 3:
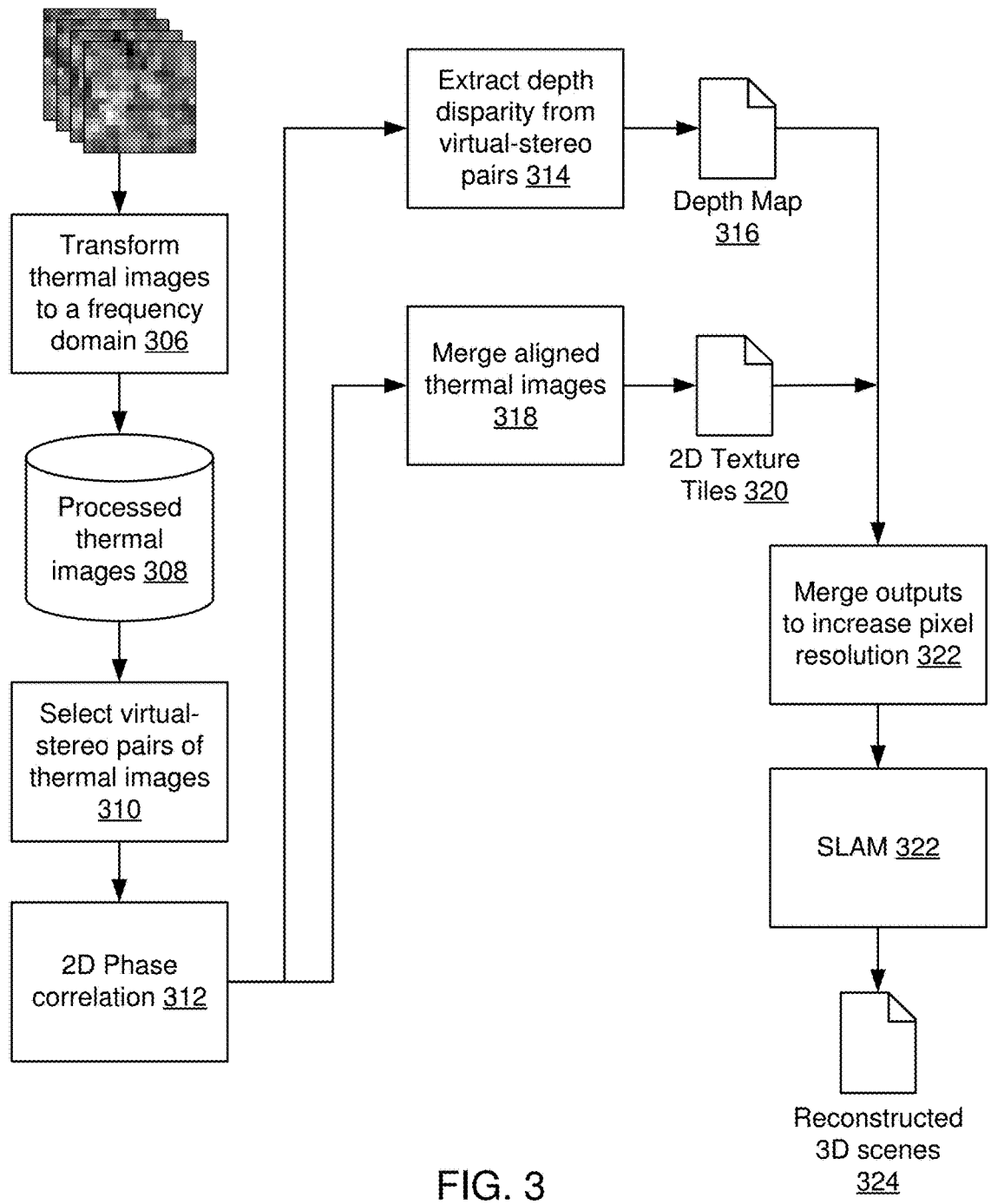
FIG. 3 is a flow diagram that illustrates an example method for triangulation-based 3D reconstruction.

FIG. 3 is a flow diagram that illustrates an example method for triangulation-based 3D reconstruction. Image-based ranging is triangulation-based in that angles between individual cameras and an object captured in a stereo pair of images generated by the cameras can be measured to determine a range to the object. As described earlier, a thermal imaging system can be used to process thermal images generated by thermal sensors to create a 3D reconstruction of an ambient environment. The thermal images output by the thermal sensors can be split into a plurality of thermal image tiles 302. For example, an image splitting or cutting technique can be used to split a thermal image into a number of thermal image tiles 302. As in block 306, the thermal image tiles 302 can be transformed to a frequency domain. Also, optical aberration correction can be performed on the thermal image tiles 302. For example, instead of performing the traditional full rectilinear rectification, differential rectification can be performed to reduce the correction amount by transforming each thermal image tile 302 to an average distortion of all participating thermal image tiles 302, thereby replacing warping with small shifts performed in the frequency domain. The transformed and corrected thermal image tiles can be stored to memory 308 (e.g., random access memory (RAM)) so that the frequency domain transformation and optical aberration correction need only be performed once even if a thermal image tile 302 is used in multiple virtual-stereo pairs.

As in block 308, as described earlier, a subset of possible thermal image tiles 302 can be selected as virtual-stereo pairs, and as in block 310, 2D phase correlation can be performed on each of the virtual-stereo pairs to estimate a relative translative offset between two similar thermal image tiles in a virtual-stereo pair using the frequency domain to which the thermal image tiles 302 were transformed. As in block 314, depth disparity can be extracted from the virtual-stereo pairs using a trained convolutional neural network. In a conventional binocular stereo system, disparity is an offset between image elements. In a multi-sensor system, disparity is a reciprocal to an object distance, where a single scalar value is common to corresponding image tiles output of the thermal sensors in the multi-sensor system. As a simplified explanation, viewing an object in image tiles generated by a ring of 16 thermal sensors, as the object moves closer, its representation will move an amount down in an image output by a 12-o-clock positioned (top) thermal sensor, and by the same amount up in an image tile output by a 6-o-clock positioned (bottom) thermal sensor, and the same amount left in an image tile output by a 3-0-clock positioned (right) thermal sensor, and so on. This amount is the depth disparity. A common or generalized disparity may be calculated for a plurality of virtual-stereo pairs. In the case that interscene accumulation is used, such disparity (as a reciprocal measure of object distance) may be calculated for the thermal images in a sequence of scenes. As an example, for a one-hundred frame sequence and sixteen virtual-stereo pairs, a disparity value involves processing of sixteen-hundred virtual-stereo pairs. The depth disparity output can be used to produce a depth map 316 which may comprise an image or image channel that contains information relating to a distance of surfaces of scene objects from a viewpoint of the thermal sensors.

As in block 318, the virtual-stereo pairs, which have been aligned via 2D phase correlation, can be merged to form 2D texture tiles. For example, having determined the distance of an object represented in an image tile, the object's representation can be calculated in each virtual-stereo pair and the virtual-stereo pairs can be stacked together. As an example, suppose a distant billboard with a letter "A" is in view of a thermal imaging system that has sixteen thermal sensors, such that the letter "A" fits into a 16×16 pixel window. In each of the sixteen image tiles generated by each of the sixteen thermal sensors, the letter "A" will have different pixel coordinates. Because the geometry and distance of the thermal sensors is known, the thermal imaging system can calculate the 16×16 pixel widow for each image tile that will correspond to other image tiles, and sixteen of 16×16 image tiles can be clipped and stacked together to improve the S/R ratio. Clipping of the image tiles may be subpixel-accurate, and a lossless shift by a fraction of a pixel can be implemented as a phase shift in frequency domain.

The 2D texture tiles can be used to generate a 3D scene. As in block 322, the depth map 316 and the 2D texture tiles 320 can be merged to increase pixel resolution in a sequence of 3D scenes 324, which as in block 322, can be processed using a simultaneous localization and mapping technique to enhance the reconstructed 3D scenes 324 and mitigate motion-blur in the 3D scenes 324. In particular, as described below in association with FIG. 4, image matching can be used to improve the quality of the 3D reconstruction.

Figure 4:
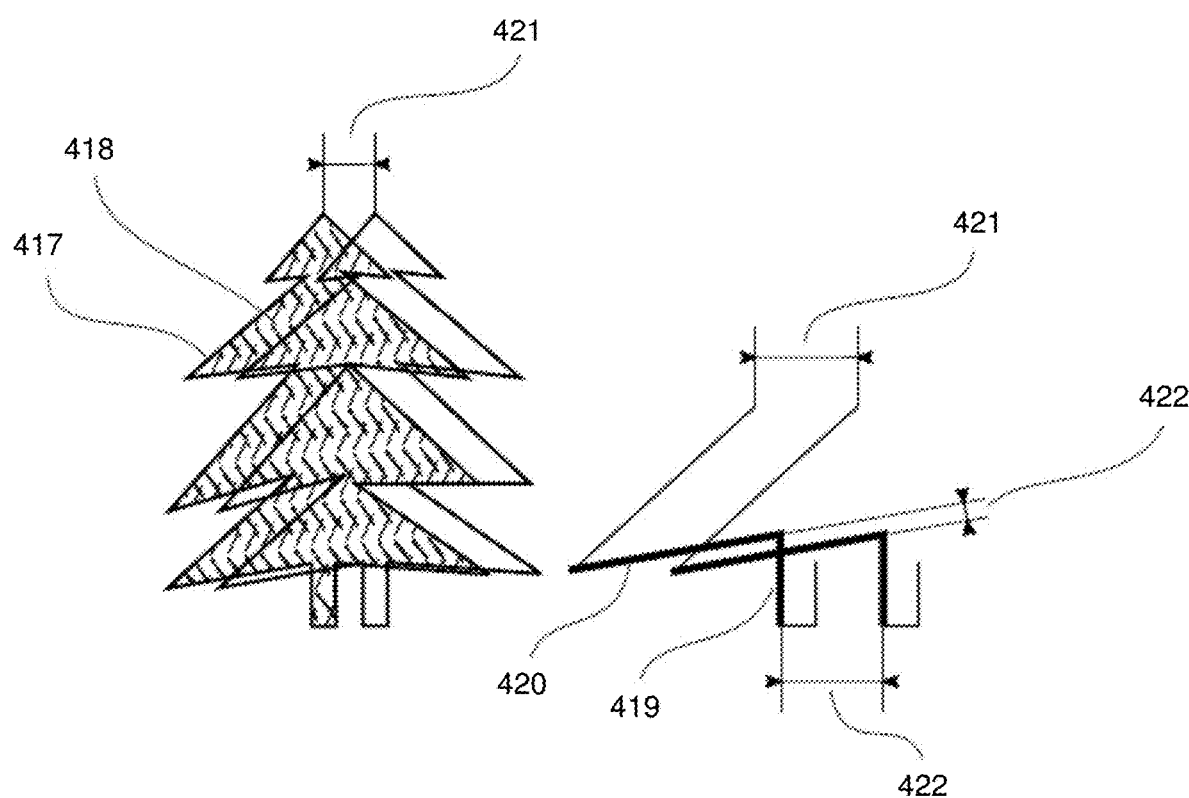
FIG. 4 is a diagram illustrating contour and texture features used for used for stereo image matching and stereo image mismatch for different directions of object edges.

FIG. 4 illustrates the features of contour 417 and texture 418 which can be used for image matching. Contour 417 comprises an outline of a foreground object over a background, and texture 418 corresponds to the materials and/or colors of the foreground object or geometric features with depth differences smaller than depth resolution at the object distance. When using monochrome thermal images, the texture 418 of environmental objects has lower contrast than that of color visible range images. This is because a pixel value depends on the object temperature, and without ambient illumination and low airflow, most objects other than living organisms and machinery, are in thermal equilibrium with the surrounding environment. The contour 417 usually has higher contrast as it corresponds to separate (often distant) objects (foreground and background) with more considerable temperature differences. The contour 417 of the object comprises a 1D feature (e.g., a line) which may have any direction, and thus, may be at any angle to a camera baseline (the distance between two thermal sensors) of a virtual-stereo pair of image tiles. A disparity 421 for a virtual-stereo pair of image tiles is illustrated in FIG. 4. When an object is offset horizontally in a virtual-stereo pair, the feature mismatch 422 for the vertical segments 419 of the contour 417 is as significant as the disparity 421. However, for the horizontal segments 420 (near-horizontal shown), the feature mismatch 422 is reduced and reaches zero at precisely horizontal. As the feature mismatch 422 between thermal images is reduced, so does the capability to measure disparity 421 and, consequently, the distance to the object. The efficient use of contours 417 to measure image mismatch may be performed using multiple directions obtained from multiple virtual-stereo pairs of image tiles generated by multiple thermal sensors.

Figure 5:
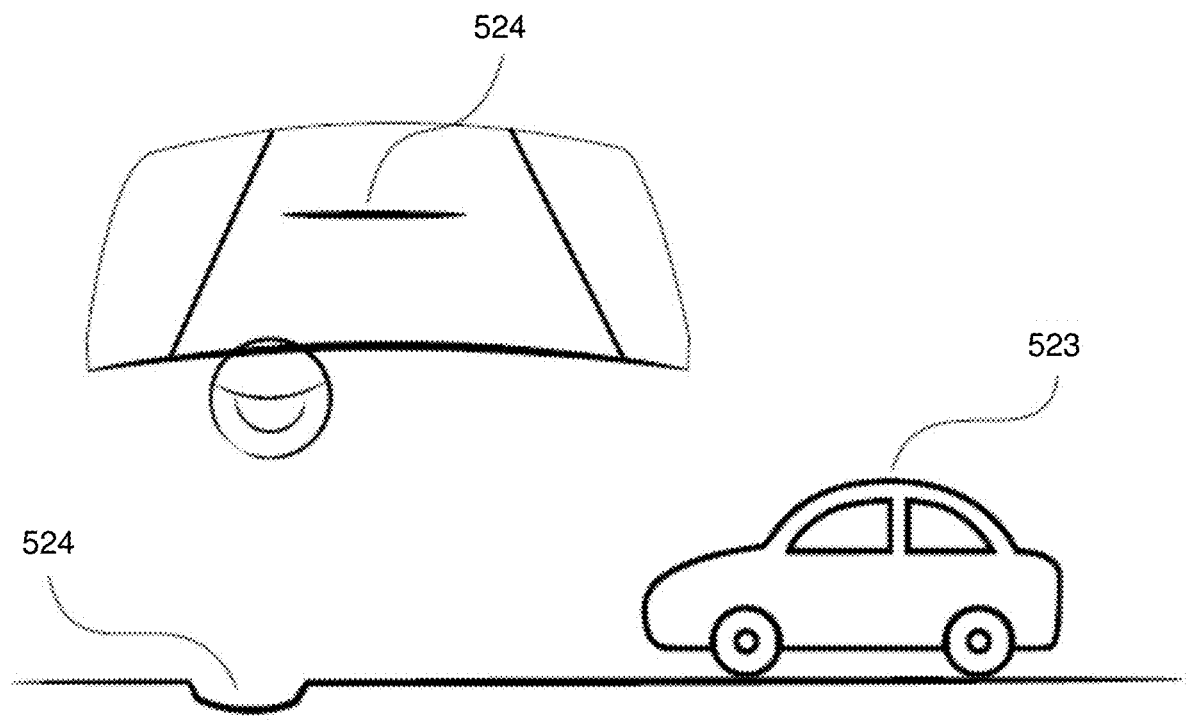
FIG. 5 is a diagram that illustrates an example negative obstacle as viewed by a horizontal binocular stereo camera.

The present technology can be used for autonomous vehicle navigation and driver assistance, including high-speed vehicle navigation in nighttime conditions. Referring generally to FIGS. 4 and 5, one challenge for autonomous vehicle navigation is detecting negative obstacles 524, such as a pothole in a road, a ditch, or other depression, that when detected from a distance (e.g., from a vehicle 523) can appear to be a horizontal feature. Another challenge for autonomous vehicle navigation is motion-blur of stationary objects caused by egomotion (i.e., the linear movement and three axes of rotation of a thermal sensor). For distant objects where the object distance is much larger than a camera baseline (which is the case for autonomous vehicle navigation), a motion-blur vector of a same object registered by each of the thermal sensors may be considered as having the same direction. Only the projection of the motion-blur on the baseline adversely influences a measurement of object disparity, so virtual-stereo pairs can be selected individually for each image tile to minimize the projection.

Figure 6:
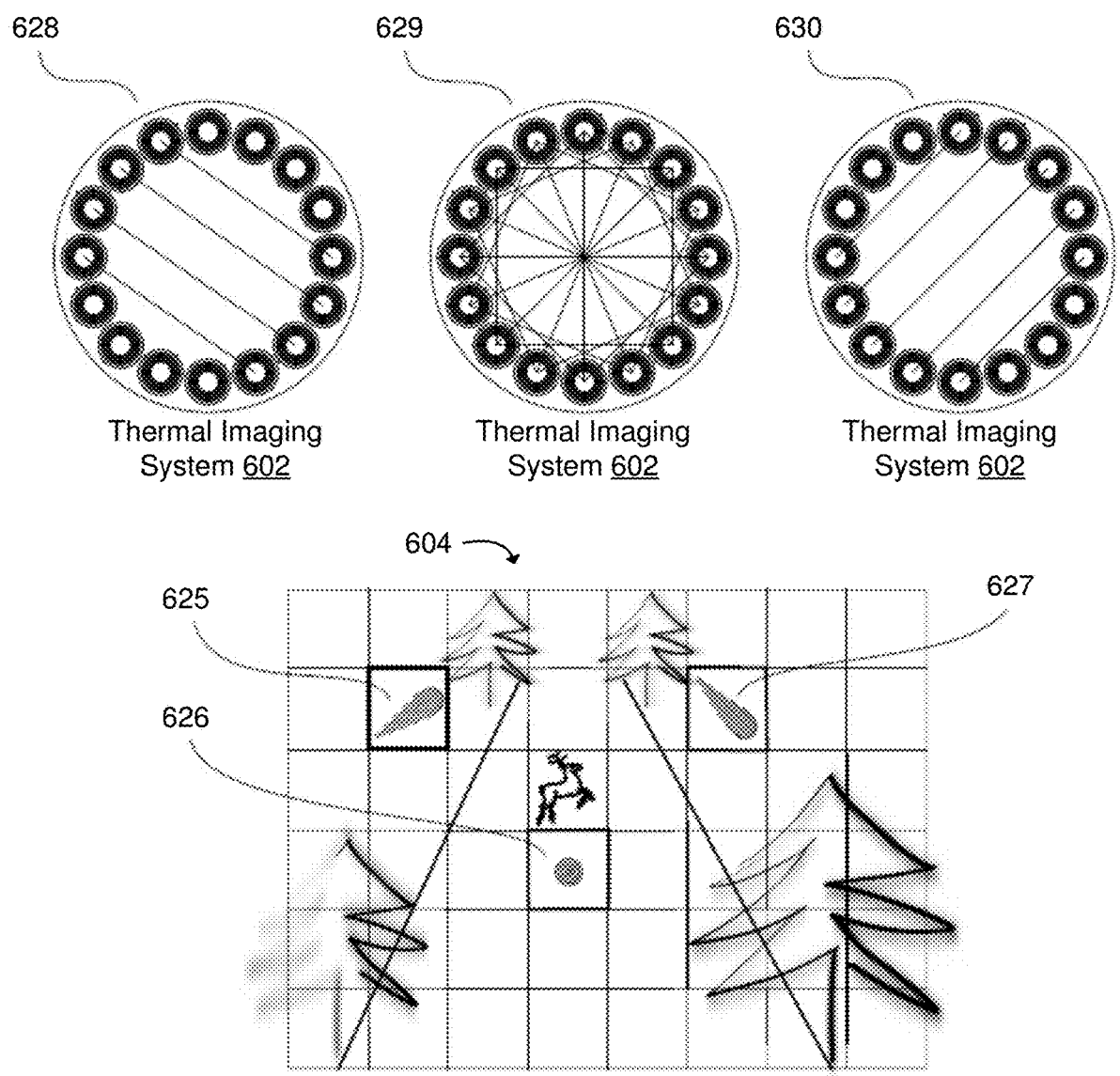
FIG. 6 is a diagram illustrating virtual-stereo pair selection of thermal images for an example scene.

FIG. 6 illustrates virtual-stereo pair selection of image tiles for an example scene 604 where a vehicle (not shown) having an attached thermal imaging system 602 rotates around its velocity vector (roll). Such rotation causes different motion-blur in different parts of the scene 604. For example, an image tile 625 on the left side of the scene 604 includes an up-right motion-blur artifact, an image tile 627 on the left side of the scene 604 includes a down-right motion-blur artifact, and an image tile 626 in the center of the scene 604 has no motion-blur artifacts. As illustrated, virtual-stereo pairs selections corresponding to the movement of the vehicle (rotation around its velocity vector) can be made to mitigate the motion-blur artifacts in the scene 604. For example, virtual-stereo pairs generated by four down-right thermal sensor pairs 628 can be selected to mitigate the up-right motion-blur artifact in the image tile 625, and virtual-stereo pairs generated by five up-right thermal sensor pairs 630 can be selected to mitigate the down-right motion-blur artifact in the image tile 627.

As an illustration, the thermal imaging system can estimate camera egomotion using sensor data obtained from an IMU) or from previous scenes. The thermal imaging system can iterate through the image tiles of interest and calculate 2D motion blur vector for the image tile from the egomotion and an estimated 3D map. The thermal imaging system can then determine if the motion blur exceeds an application-specific threshold, which can depend on several factors. If the motion blur is small, another method of pair selection can be used (e.g., perpendicular to edge of a foreground object), otherwise the thermal imaging system can select image pairs with baselines nearest to a perpendicular to a 2D motion blur vector for the selected image tile. The thermal imaging system can then continue to the next image tile to process. In examples where a deep neural network is used to mitigate motion blur, factors influencing selection can be weighted and considered simultaneously. When computing resource permit, it may be possible to evaluate every virtual-stereo pair of image tiles, as in the example of a quad camera system, where six pairs (2 horizontal, 2 vertical, and 2 diagonal) for every image tile can be input to a deep neural network that uses each of the virtual-stereo pairs of image tiles to identify and mitigate motion blur. Virtual-stereo pairs generated by symmetrical pairs of thermal sensors 629 can be selected for image tiles 626 that do not contain motion-blur artifacts.

The direction of virtual-stereo pairs may be selected with twice smaller angular steps than that of the corresponding infrared sensor locations. For example, the virtual-stereo pairs can be parallel to either the diameter through the thermal sensor centers (as in 630) or the diameter halfway between the thermal sensors (as in 628). The maximal angular error for each infrared sensor pair is plus/minus half of the angular step, so the total reduction of motion-blur corresponding to virtual-stereo pairs selection is $$\sin\frac{\pi}{2N},$$

where N is total number of infrared sensors. For N=16, the motion-blur can be reduced approximately ten times:

$$\sin\frac{\pi}{32} = 0.098.$$

In the case of small motion-blur and no preference in edge detection orientation, more virtual-stereo pairs may be matched using the symmetrical pair configuration 629, where each image tile participates in two orthogonal virtual-stereo pairs that make up independent measurements and a diameter (longest pair). Such a set of virtual-stereo pairs has implicit interdependence, and this redundancy can be filtered by the tile depth processor 210 shown in FIG. 2.

Figure 7:
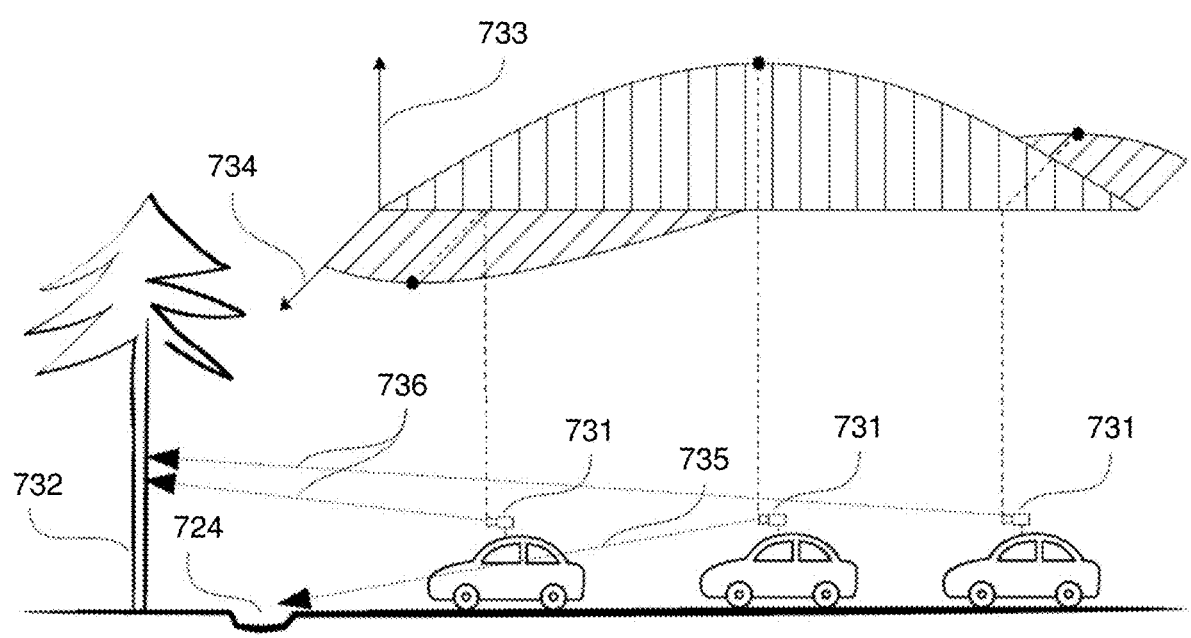
FIG. 7 is a diagram that illustrates ranging of different direction features when corresponding motion blur projection crosses zero.

In one example, complementary scene reconstruction enhancement can be performed when high levels of motion-blur are caused by vibrations (e.g., when running or operating a vehicle at high-speed over rough terrain) using the SLAM module 213 shown in FIG. 2. This method assumes that most of the scene is stationary, and the same world objects can be ranged at different times. FIG. 7 illustrates this method. When a vehicle and attached thermal imaging system 731 moves along a path, motion-blur can be caused by the following reasons: forward movement that causes apparent 2D object movement down (and sideways for the world objects that are not directly in front of the vehicle), right or left movement when the vehicle makes turns, and random movements (e.g., vibrations caused by driving over rough terrain). The first factor causes significant motion-blur at high-speed at short ranges that are typically much smaller than the stopping distance at that speed and, as such, is not crucial for the navigation. The second factor may cause horizontal motion-blur of vertical features, and the thermal imaging system will have to rely on horizontal or near-horizontal features for ranging. Typically the third factor is the predominant source of motion-blur. In this case, the projection of the apparent 2D velocity of the object's image on any direction crosses zero twice over the vibrations period.

FIG. 7 also illustrates pitch 733 and yaw 734 plots synchronized to the forward movement of a vehicle-attached thermal imaging system 731. These vibrational axes are optimal for ranging vertical and horizontal features, such as a tree 732 and pothole 724, respectively. The horizontal feature 735 distance can be measured when the vertical component of the motion-blur vector crosses zero (e.g., pitch rate is near zero), and the vertical features 736 can be ranged when the yaw 734 rotation is near zero. There are no limitations on the phase shift between the horizontal and vertical oscillations, where each thermal image tile can be processed independently when the motion-blur component of interest (pitch 733 and/or yaw 734) for the viewed object (e.g., tree 732, pothole 724, etc.) crosses zero.

For example, in the case of absolutely smooth linear movement of a vehicle-mounted front-facing thermal imaging system 731, motion-blur will be mostly vertical (motion-blur vectors will originate at the point at the horizon) and the vertical component will not cross zero. The same is true with horizontal motion-blur when the vehicle is moving along a curve on a highway. This amount of motion-blur is small and may not impact image matching. However, random angular movements (e.g., vibration caused by a rough road) can result in significant motion-blur that impacts image matching. In this case, the two orthogonal components of random angular motion (e.g., vertical and horizontal) each often cross zero (zero-pitch and zero-yaw rate) when a diving motion (down-pitch) of a thermal sensor changes to a rising motion (up-pitch), and left side vibration of the thermal sensor changes to right side vibration (and vice versa). Occurrences of angular motion crossing zero can happen often and may occur less than a second apart, allowing for ranging of distant objects (e.g., tree 732, pothole 724, etc.). As an example, to measure the distance to a vertical tree 732, the vehicle-mounted thermal imaging system 731 can detect when the horizontal rotation of the thermal imaging system 731 with respect to the tree 732 crosses zero (crosses zero yaw rotation). To measure the distance to a pothole 721, the vehicle-mounted thermal imaging system 731 can detect when the vertical rotation of the thermal imaging system 731 with respect to the pothole 724 crosses zero (crosses zero pitch rotation). At the point that zero pitch or rotation are detected, the thermal imaging system 731 can obtain a thermal image tile (e.g., select a thermal image from a video stream) and measure a distance to the object (e.g., tree 732, pothole 724, etc.) using the method for calculating a distance of an object in an image described herein.

FIGS. 8A-B illustrate the use of intrascene 2D correlations (FIG. 8A) and interscene accumulation (FIG. 8B) to increase a signal-to-noise (S/N) ratio of low-contrast objects in thermal images. Interscene accumulation of intrascene 2D correlations can be used to increase an S/N ratio of low-contrast objects typically over an order of magnitude. Because egomotion can cause the appearance of movement of a low contrast object in a scene, interscene accumulation of intrascene 2D correlations can be used to increase S/N ratio so that a static location of the low contrast object in the scene can be determined.

As an illustration of intrascene 2D correlation shown in FIG. 8A, simultaneously registered views of an offset object 837 are input to a 2D phase correlator (e.g., the 2D phase correlator module 208 in FIG. 2) which produces two horizontal pairs of 2D correlations 838 and two vertical pairs of 2D correlations 839. In the case of low-contrast images, the 2D correlations 838 and 839 contain insufficient data to determine the positions of the correlation maximums. Instead, this method defers this operation to a later stage when the S/N ratio of the combination of multiple measurements reaches an acceptable level. The 2D correlations 838 and 839 (two horizontal and two vertical) are subject to affine transformations to align and scale the disparity offsets, and used to produce a combined quad 2D correlation 840 by accumulation. In this example, the horizontal pairs of 2D correlations 838 require no transformations, and the vertical pairs of 2D correlations 839 are rotated by 90°.

Figure 8C:
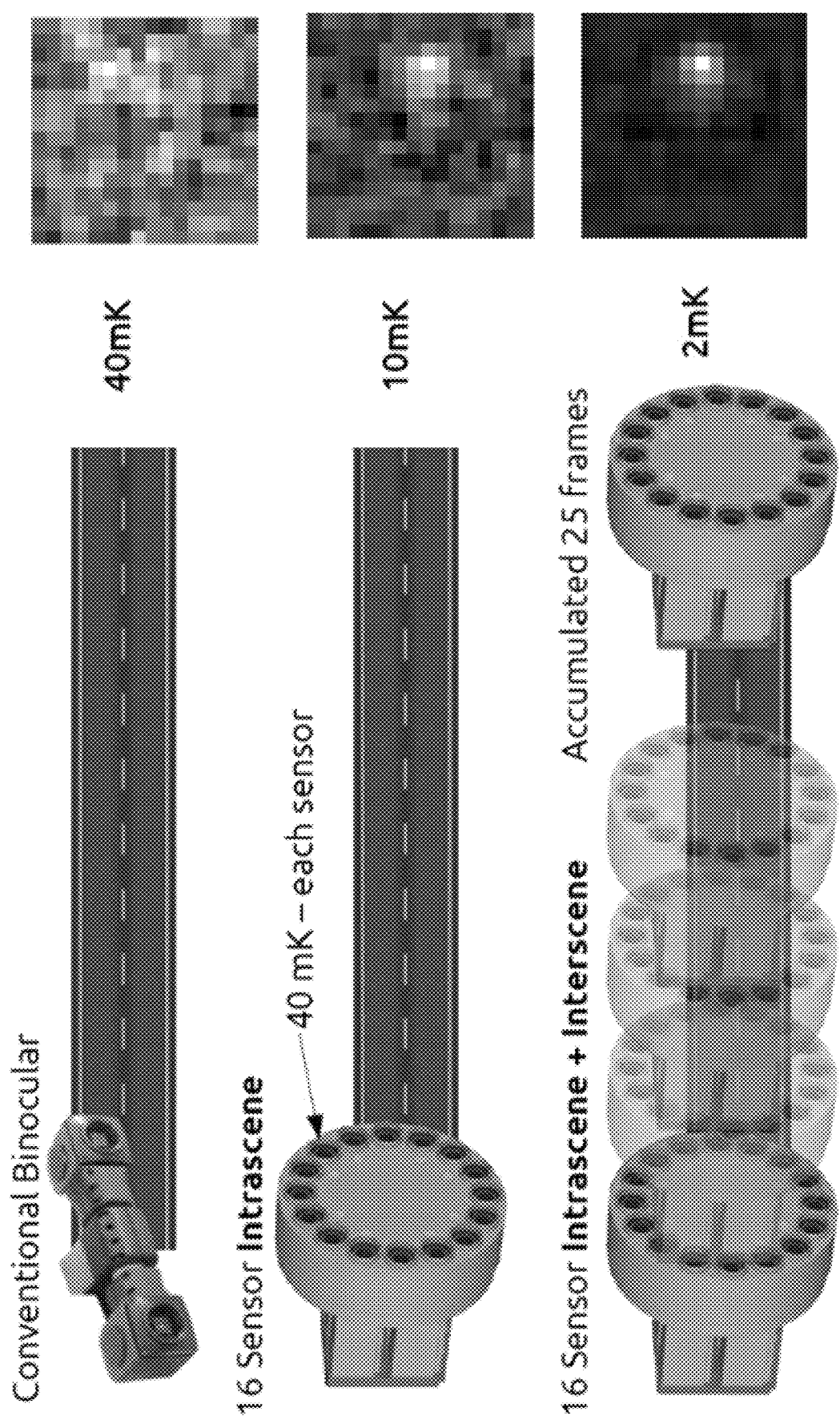

As an illustration of interscene accumulation shown in FIG. 8B, the same objects are traced through multiple frames preceding a current frame. The combined quad 2D correlation 840 of each scene can be corrected according to egomotion to follow the object movements across the camera field-of-view 841, and the corrected intrascene 2D correlations can be accumulated to produce an interscene accumulated 2D correlation 842 that increases an S/N ratio of the object. FIG. 8C illustrates contrast improvement between a conventional binocular system, an example sixteen thermal sensor system using intrascene accumulation, and an example sixteen thermal sensor system using intrascene and interscene accumulation.

Figure 9:
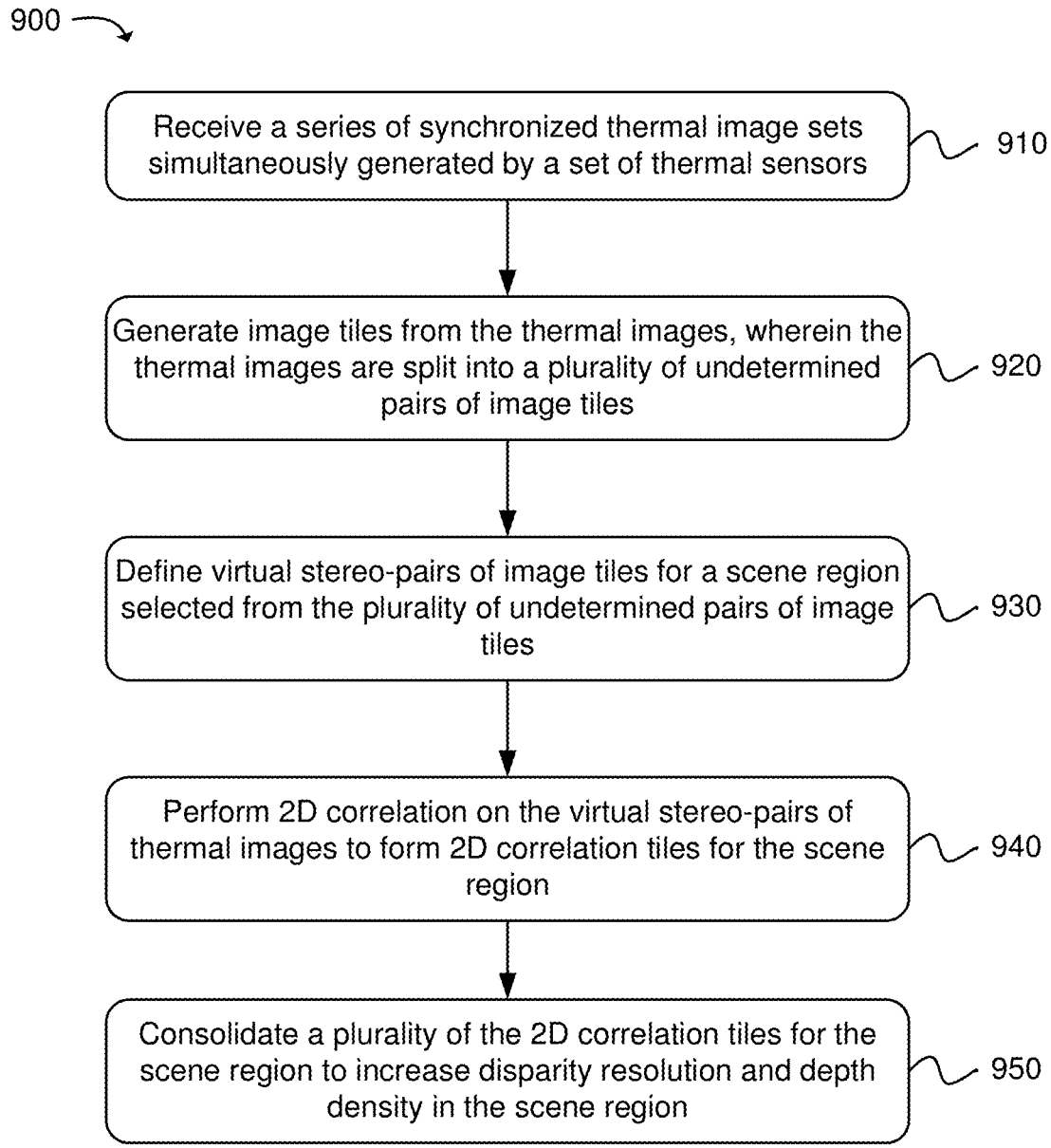
FIG. 9 is a flow diagram illustrating an example method for thermal imaging.

FIG. 9 is a flow diagram illustrating an example method 900 for thermal imaging. As in block 910, a series of synchronized thermal image sets may be obtained from a plurality of thermal sensors (e.g., three or more thermal sensors) configured to simultaneously image scene regions of an ambient environment. The thermal sensors may be in a non-collinear configuration (e.g., a circular configuration, trapezoid configuration, and other non-collinear configurations). In one example, the number of thermal sensors used to generate the series of synchronized thermal image sets may be based in part on an estimate of motion blur in the thermal images.

As in block 920, image tiles may be generated from the thermal images, wherein the thermal images can be split into a plurality of undetermined pairs of image tiles. The thermal images can be split or cut into a plurality of image tiles using an image splitting technique. Pair-wise associations between the thermal images in the synchronized thermal image sets may be undefined at the moment of registration. That is, "undetermined" means that at the time the thermal images are generated, it is not yet known which image tiles obtained from the thermal images will be paired to form virtual-stereo pairs. For example, unlike a binocular system which only has two cameras that predefine image pairs, the synchronized thermal image sets do not contain predefined pairs of thermal images. Virtual stereo pairs for each image tile can be assigned dynamically, depending on the scene objects types (contrast, movement) and an amount of motion-blur, and needed ranging accuracy.

In one example, differential rectification can be performed on the image tiles, such that the differential rectification on an image tile produces a complex frequency domain tile. For example, differential rectification may include transforming an image tile to a frequency domain and performing optical aberration correction of the image tile.

As in block 930, virtual-stereo pairs of image tiles may be selected from the undetermined pairs of image tiles. For example, a subset of possible image tile pair can be identified and selected as virtual-stereo pairs. The virtual-stereo pairs may be associated with pairs of the thermal sensors and scene regions of the ambient environment. In one example, a selection of a pair of image tiles may be based in part on a scene feature captured in the series of synchronized thermal image sets. Also, in one example, an amount of motion blur in the image tiles can be estimated and a number of pairs of image tiles for a scene region can be selected based in part on the estimation of motion blur contained in the image tiles.

As in block 940, two-dimensional (2D) correlation can be performed on the virtual-stereo pairs to form 2D correlation tiles for each scene region of the ambient environment. For example, a virtual-stereo pair of image tiles, which have been processed using differential rectification, can be processed using 2D correlation to produce a 2D correlation tile. In one example, the 2D correlation tiles can be accumulated (stored) in a memory device so that the 2D correlation tiles (historical 2D correlation tiles) can be used at a later time to generate a depth map.

As in block 950, a plurality of the 2D correlation tiles for the scene region can be consolidated (merged) to increase disparity resolution and depth density in the scene region. For example, a depth map of the ambient environment can be created by consolidating multiple 2D correlation tiles for a same scene region into a consolidated tile to increase contrast of objects represented in the scene region of the depth map. In one example, current and historic 2D correlation tiles for each scene region can be consolidated to increase contrast of objects represented in the depth map. In one example, generating the depth map can include performing historical data interpolation from neighboring 2D correlation tiles and affine geometric transformations using a neural network model to compensate for pose variations of the thermal sensors. In another example, generating the depth map can include obtaining 2D correlation tiles from memory and performing interscene consolidation of current and historic intrascene 2D correlation tiles. In another example, generating the depth map can include performing texture processing of the 2D correlation tiles by merging 2D correlation tiles associated with a same scene region using the depth information for the 2D correlation tiles to form 2D texture output. In yet another example, lateral resolution enhancement can be performed, which can comprise merging the 2D texture output and scene region depth information using a neural network model to form the depth map of the ambient environment.

In one example, simultaneous localization and mapping (SLAM) can be performed which may include updating linear features in the depth map when motion blur components perpendicular to the linear features cross zero. In some examples, an object identified in a 2D correlation tile associated with a scene region can be tracked in subsequent 2D correlation tiles while the object is in a field-of-view. An initial estimated distance of the object can be calculated from a thermal imaging position (e.g., thermal imaging system position) using the depth map, and the estimated distance of the object can be updated using iteratively refined depth map output.

The operations described above can be performed in the pixel (spatial) domain and/or the frequency domain. Information-wise both domains may be equivalent. However, performing some operations in one domain of the domains as opposed to the other domain may be more convenient. Accordingly, differential rectification and 2D correlation is performed in the frequency domain, however, the other operations described above may be performed in either of the frequency domain or the pixel domain.

Figure 10:
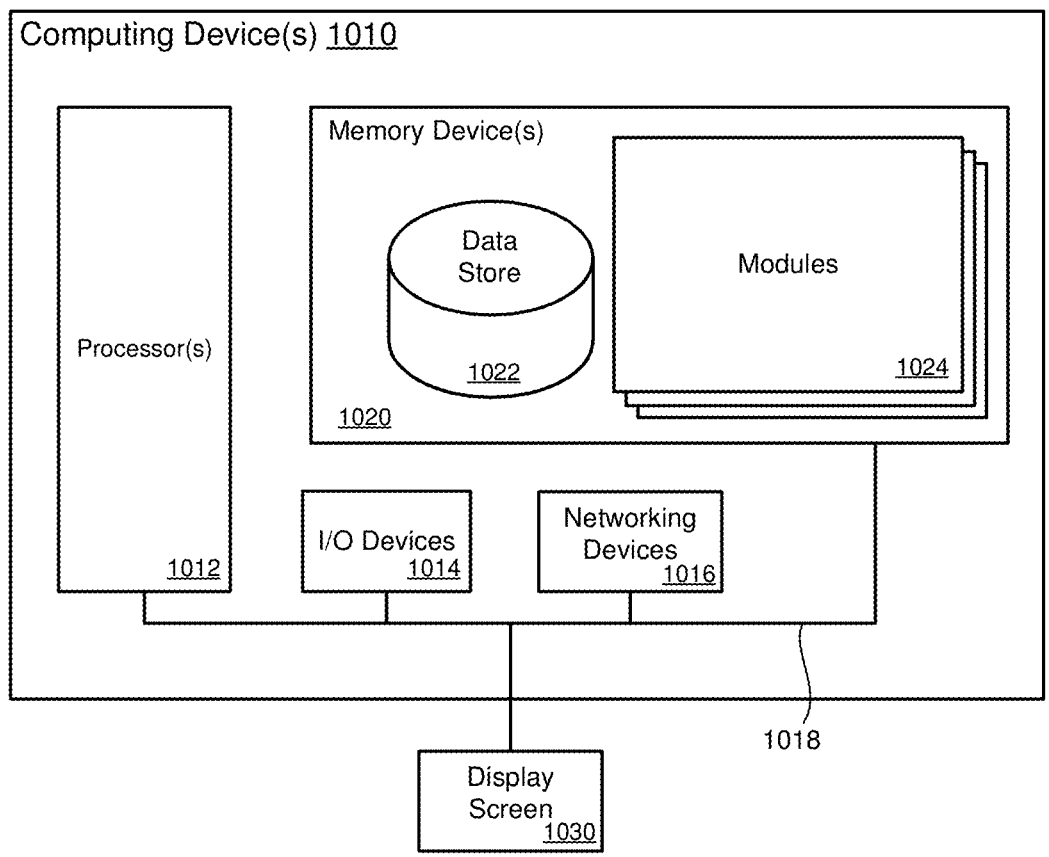
FIG. 10 is a block diagram illustrating an example of a computing device that may be used to execute a method for thermal imaging.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device 1010. For example, the local communication interface 1018 may be a local data bus and/or any related address or control busses as may be desired.

The memory device 1020 may contain modules 1024 that are executable by the processor(s) 1012 and data for the modules 1024. In one example, the memory device 1020 may include a range estimator module, a pairs selector module, a differential rectification module, a 2D phase correlator module, a texture processor module, a tile depth processor module, a lateral resolution module, a SLAM module, and other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description may be implemented in the form of software using high-level programming languages that are compiled, interpreted or executed using a hybrid of the methods. The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local communication interface 1018 may be used as a network to facilitate communication between any of the multiple processors and multiple memories. The computing device 1010 may also have access to I/O (input/output) devices 1014 that are usable by the computing device 1010. One example of an I/O device may be a display screen 1030.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The present technology disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The present technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A thermal imaging system, comprising:
   at least three thermal sensors in a non-collinear arrangement to simultaneously generate thermal images of an ambient environment;
   at least one processor;
   at least one memory device including instructions that, when executed by the at least one processor, cause the system to:
   receive a series of synchronized thermal image sets containing the thermal images simultaneously generated by the thermal sensors;
   generate image tiles from the thermal images, wherein the thermal images are split into a plurality of undetermined pairs of image tiles associated with scene regions of the ambient environment;
   define virtual-stereo pairs of image tiles for a scene region of the ambient environment, wherein the virtual-stereo pairs of image tiles are selected from the plurality of undetermined pairs of image tiles, and the virtual-stereo pairs of image tiles provide views of the scene region at different viewpoints used to enhance depth density of the scene region;
   perform two-dimensional (2D) correlation on the virtual-stereo pairs of image tiles to form 2D correlation tiles for the scene region of the ambient environment; and
   generate a depth map of the ambient environment using consolidated 2D correlation tiles, wherein a plurality of the 2D correlation tiles for the scene region are consolidated to increase disparity resolution and depth density in the depth map.

2. The system in claim 1, wherein the memory device further includes instructions that, when executed by the at least one processor, cause the system to perform differential rectification of the image tiles, including:
   transforming the image tiles to a frequency domain; and
   performing optical aberration correction of the image tiles.

3. The system in claim 1, wherein the instructions that cause the system to generate the depth map of the ambient environment further cause the system to:
   determine a disparity between different representations of a same object in image tiles corresponding to the scene region using a convolutional neural network model.

4. The system in claim 1, wherein the memory device further includes instructions that, when executed by the at least one processor, cause the system to perform texture processing of the 2D correlation tiles, including:
   merging 2D correlation tiles associated with a same scene region using depth information for the 2D correlation tiles to form 2D texture output used to generate the depth map of the ambient environment.

5. The system in claim 4, wherein the memory device further includes instructions that, when executed by the at least one processor, cause the system to perform lateral resolution enhancement, including:
   merging the 2D texture output and scene region depth information using a neural network model to form the depth map of the ambient environment.

6. The system in claim 5, wherein the memory device further includes instructions that, when executed by the at least one processor, cause the system to perform simultaneous localization and mapping (SLAM), including:
   updating linear features in the depth map when motion blur components perpendicular to the linear features cross zero.

7. A computer implemented method for thermal imaging, comprising:
   receiving a series of synchronized thermal image sets containing thermal images generated by a plurality of thermal sensors in a non-collinear configuration to simultaneously image scene regions of an ambient environment;
   generating image tiles from the thermal images, wherein the thermal images are split into a plurality of undetermined pairs of image tiles;
   transforming the image tiles to a frequency domain;
   defining virtual-stereo pairs of image tiles for a scene region of the ambient environment, wherein the virtual-stereo pairs of image tiles are selected from the plurality of undetermined pairs of image tiles;
   performing two-dimensional (2D) correlation on the virtual-stereo pairs of image tiles to form 2D correlation tiles for the scene region of the ambient environment, wherein the 2D correlation is implemented as phase correlation in the frequency domain; and
   generating a depth map of the ambient environment using consolidated 2D correlation tiles, wherein the 2D correlation tiles for the scene region are consolidated to increase contrast of objects represented in the depth map.

8. The method in claim 7, wherein a number of thermal sensors used to generate the series of synchronized thermal image sets is based in part on an estimate of motion blur in the thermal images.

9. The method in claim 7, wherein selecting the virtual-stereo pairs of image tiles further comprises:
   estimating an amount of motion blur in the image tiles; and
   selecting a number of virtual-stereo pairs of image tiles for the scene region based in part on the estimate of motion blur contained in the image tiles.

10. The method in claim 7, wherein a selection of a virtual-stereo pair of image tiles is based in part on a scene feature captured in the image tiles.

11. The method in claim 7, further comprising:
    identifying an object in a 2D correlation tile associated with a scene region; and
    tracking the object identified in the scene region in subsequent 2D correlation tiles while the object is in a field-of-view.

12. The method in claim 11, further comprising:
    calculating an initial estimated distance of the object from a thermal imaging position using the depth map; and
    updating the estimated distance of the object using iteratively refined depth map output.

13. The method in claim 7, wherein generating the depth map further comprises performing historical data interpolation from neighboring 2D correlation tiles and affine geometric transformations using a neural network model to compensate for pose variations of the thermal sensors.

14. The method in claim 7, wherein generating the depth map further comprises performing interscene consolidation of current and historic intrascene 2D correlation tiles.

15. The method in claim 7, wherein generating the depth map further comprises accumulating the 2D correlation tiles in a memory device.

16. A non-transitory machine readable storage medium including instructions embodied thereon, wherein the instructions, when executed by at least one processor:
- obtain a series of synchronized thermal image sets containing thermal images generated by a plurality of thermal sensors in a non-collinear configuration to simultaneously image scene regions of an ambient environment;
- generate image tiles from the thermal images, wherein the thermal images are split into a plurality of image tiles, wherein the plurality of image tiles do not contain predefined pairs of image tiles;
- transform the image tiles to a frequency domain;
- define virtual-stereo pairs of image tiles for a scene region of the ambient environment, wherein the virtual-stereo pairs of image tiles are selected from the plurality of image tiles;
- perform two-dimensional (2D) correlation on the virtual-stereo pairs of image tiles to form 2D correlation tiles for the scene region of the ambient environment, wherein the 2D correlation is implemented as phase correlation in the frequency domain;
- generate a depth map of the ambient environment using the 2D correlation tiles, wherein the 2D correlation tiles for the scene region are consolidated to increase contrast of objects represented in the depth map; and
- generate a three-dimension (3D) reconstruction of the ambient environment using the depth map.

17. The non-transitory machine readable storage medium in claim 16, further comprising instructions, that when executed by the at least one processor, identify a disparity between an object represented in the virtual-stereo pairs of image tiles using a convolutional neural network model to increase a disparity resolution in the depth map.

18. The non-transitory machine readable storage medium in claim 16, further comprising instructions, that when executed by the at least one processor, merge 2D correlation tiles associated with a same scene region using depth information for the 2D correlation tiles to form 2D texture output used to generate the depth map of the ambient environment.

19. The non-transitory machine readable storage medium in claim 16, further comprising instructions, that when executed by the at least one processor, merge 2D texture output with depth information using a neural network model to form the depth map of the ambient environment that enhances lateral resolution.

20. The non-transitory machine readable storage medium in claim 16, further comprising instructions, that when executed by the at least one processor, update linear features in the depth map of the ambient environment when motion blur components perpendicular to the linear features cross zero.

* * * * *